US012239985B2

(12) United States Patent
Carreel et al.

(10) Patent No.: US 12,239,985 B2
(45) Date of Patent: Mar. 4, 2025

(54) SYSTEM AND APPARATUS FOR INJECTING DROPLETS IN A MICROFLUIDIC SYSTEM

(71) Applicant: WITHINGS, Issy-les-Moulineaux (FR)

(72) Inventors: Eric Carreel, Issy-les-Moulineaux (FR); Charlotte Leger, Issy-les-Moulineaux (FR); Pierre-Antoine Cuniasse, Issy-les-Moulineaux (FR); Elian Martin, Issy-les-Moulineaux (FR)

(73) Assignee: WITHINGS, Issy-les-Moulineaux (FR)

( * ) Notice: Subject to any disclaimer, the term of this patent is extended or adjusted under 35 U.S.C. 154(b) by 797 days.

(21) Appl. No.: 17/441,344

(22) PCT Filed: Apr. 7, 2020

(86) PCT No.: PCT/EP2020/059917
§ 371 (c)(1),
(2) Date: Sep. 21, 2021

(87) PCT Pub. No.: WO2020/208031
PCT Pub. Date: Oct. 15, 2020

(65) Prior Publication Data
US 2022/0161262 A1    May 26, 2022

(30) Foreign Application Priority Data

Apr. 8, 2019   (EP) .................................... 19305456

(51) Int. Cl.
*B01L 3/00*   (2006.01)
*B01F 23/00*  (2022.01)
(Continued)

(52) U.S. Cl.
CPC ...... *B01L 3/502784* (2013.01); *G01N 35/085* (2013.01); *B01L 2200/027* (2013.01);
(Continued)

(58) Field of Classification Search
CPC ......... B01L 3/502784; B01L 2200/027; B01L 2200/0605; B01L 2300/0663;
(Continued)

(56) References Cited

U.S. PATENT DOCUMENTS

| 2012/0132288 | A1 | 5/2012 | Weitz et al. |
| 2018/0185841 | A1* | 7/2018 | Weber ............... B01L 3/502715 |
| 2018/0193829 | A1 | 7/2018 | Laurent et al. |

FOREIGN PATENT DOCUMENTS

WO   WO-2011146149 A1 *  11/2011  .......... B01L 3/50273

OTHER PUBLICATIONS

International Search Report related to Application No. PCT/EP2020/059917; reported on Jun. 16, 2020.
(Continued)

*Primary Examiner* — Jennifer Wecker
*Assistant Examiner* — Oyeleye Alexander Alabi
(74) *Attorney, Agent, or Firm* — Pillsbury Winthrop Shaw Pittman LLP

(57) ABSTRACT

A microfluidic apparatus for delivering droplets of a first fluid to droplets of a second fluid, comprising a main channel, with a carrier fluid carrying droplets of the second fluid, an auxiliary channel, fluidly coupled to the main channel at a first intersection via a first orifice with a first fluid interface, and at a second intersection downstream to the first intersection via a second orifice with a second fluid interface, wherein a flow of the carrier fluid induces a difference of pressure between the first and second orifice generating a balance condition such that a meniscus of the second fluid interface is maintained in the auxiliary channel, at the vicinity of the second orifice, wherein a balance deviation triggers a release of a volume of the first fluid from the second fluid interface into the main channel.

16 Claims, 7 Drawing Sheets

(51) Int. Cl.
| | |
|---|---|
| B01F 23/41 | (2022.01) |
| B01F 101/23 | (2022.01) |
| B23Q 17/24 | (2006.01) |
| C07K 14/705 | (2006.01) |
| C12M 1/34 | (2006.01) |
| C12Q 1/04 | (2006.01) |
| C12Q 1/18 | (2006.01) |
| C12Q 1/686 | (2018.01) |
| G01N 21/3577 | (2014.01) |
| G01N 21/359 | (2014.01) |
| G01N 21/39 | (2006.01) |
| G01N 21/45 | (2006.01) |
| G01N 21/64 | (2006.01) |
| G01N 21/77 | (2006.01) |
| G01N 21/78 | (2006.01) |
| G01N 27/414 | (2006.01) |
| G01N 30/12 | (2006.01) |
| G01N 30/68 | (2006.01) |
| G01N 30/70 | (2006.01) |
| G01N 30/72 | (2006.01) |
| G01N 30/88 | (2006.01) |
| G01N 33/00 | (2006.01) |
| G01N 33/18 | (2006.01) |
| G01N 33/50 | (2006.01) |
| G01N 33/53 | (2006.01) |
| G01N 33/543 | (2006.01) |
| G01N 33/68 | (2006.01) |
| G01N 33/74 | (2006.01) |
| G01N 35/00 | (2006.01) |
| G01N 35/08 | (2006.01) |
| G01N 35/10 | (2006.01) |
| G06K 7/10 | (2006.01) |
| G06K 7/14 | (2006.01) |
| G06K 19/06 | (2006.01) |
| G06K 19/07 | (2006.01) |
| G06T 7/00 | (2017.01) |
| G06T 7/90 | (2017.01) |
| H10K 10/46 | (2023.01) |
| H10K 85/00 | (2023.01) |
| H10K 85/20 | (2023.01) |

(52) U.S. Cl.
CPC ............ *B01L 2200/0605* (2013.01); *B01L 2300/0663* (2013.01); *B01L 2300/123* (2013.01); *B01L 2300/14* (2013.01); *B01L 2400/02* (2013.01); *B01L 2400/0439* (2013.01); *G01N 2035/1034* (2013.01)

(58) Field of Classification Search
CPC ........... B01L 2300/123; B01L 2300/14; B01L 2400/02; B01L 2400/0439; B01L 3/0268; B01L 2200/0673; B01L 2300/088; B01L 2400/0688; G01N 35/085; G01N 2035/1034
See application file for complete search history.

(56) References Cited

OTHER PUBLICATIONS

Minsoung Rhee, et al., "Pressure stabilizer for reproducible picoinjection in droplet microfluidic systems", Lab on A Chip, The Royal Society of Chemistry, Sep. 30, 2014, vol. 14, No. 23.

Shunbo Li, et al., "Passive Picoinjection Enables Controlled Cystallization in a Droplet Microfluidic Device", Full Paper, Small, Sep. 5, 2017, vol. 13, No. 14.

Melinda G. Simon, et al., "A Laplace pressure based microfluidic trap for passive droplet trapping and controlled release", Biomicrofluidics, American Institute of Physics, Feb. 24, 2012, vol. 6, No. 1.

* cited by examiner

SYSTEM AND APPARATUS FOR INJECTING DROPLETS IN A MICROFLUIDIC SYSTEM

CROSS-REFERENCE TO RELATED APPLICATION

This Application is a 35 USC § 371 US National Stage filing of International Application No. PCT/EP2020/059917 filed on Apr. 7, 2020 which claims priority under the Paris Convention to European Patent Application No. 19305456.6 filed on Apr. 8, 2019.

BACKGROUND AND PRIOR ART

The present document relates to handling of fluids in microfluidic and milli-fluidic systems, and more particularly in so-called droplet systems, droplet microfluidics, which are used, for instance, in biochemical and biological analysis applications. The present document deals with mixing several fluids in a controlled manner.

More specifically, the present application targets a two-phase flow in a micro-channel where droplets of a second fluid are transported by a carrier fluid. This micro-channel system allows the release of a controlled volume of a first fluid into a main channel when one droplet of the second fluid passes through an intersection between the main channel and an auxiliary channel.

The principle of a pico-injector delivering of a droplet of a first fluid into a droplet of a second fluid, at a range from picoliter to microliter, has already been studied.

Such pico-injector as illustrated in FIG. 1 is disclosed in document US2016194225. Droplets are injected from a side reservoir into a main channel, with the help of activation electrodes.

However, such pico-injector requires very fine pressure control in the side reservoir to operate properly. Such accurate absolute pressure control requires the use of expensive components. The inventors have endeavored to propose a more cost-effective solution to deliver a droplet of a first fluid into a droplet of a second fluid, in a range from picoliter to microliter.

SUMMARY OF THE DISCLOSURE

The present document promotes a microfluidic apparatus with a controlled system for delivering one or more release of a volume of a first fluid with one or more droplets of a second fluid comprising:
  a main channel, with a carrier fluid having a flow direction, the carrier fluid carrying one or more droplets of the second fluid immersed in the carrier fluid,
  an auxiliary channel, formed as a reservoir having a predefined closed volume, fluidly coupled to the main channel at two intersections wherein the auxiliary channels connects to:
    a first intersection via a first orifice configured to create a first fluid interface between the carrier fluid and the first fluid in the auxiliary channel;
    a second intersection downstream to the first intersection via a second orifice configured to create a second fluid interface between the carrier fluid and the first fluid;
wherein a flow of the carrier fluid induces a difference of pressure between the first and second orifice generating a balance condition such that a meniscus of the second fluid interface is maintained in the auxiliary channel, at the vicinity of the second orifice;
wherein a balance deviation, with regard to the balance condition, greater than a predefined threshold, triggers a release of a volume of the first fluid from the second fluid interface into the main channel.

As a result, no fine pressure control is required in such apparatus. Instead, a relative pressure drop is used to create the above mentioned balance condition, which is less costly than the use of high accuracy pump(s). The size of the microfluidic chip is thus optimized and scalable. This microfluidic device is also a favorable solution from the point of view of electricity consumption.

We note here that the so called "balance deviation" can be of any type of phenomenon, and generated by any type of actuator.

Under the clause "release of a volume", it should be understood release of one droplet, but it is not limited to a droplet release. This said volume can also be released directly into one droplet circulating into the main channel.

The balance condition means that the microfluidic device is set up in such a manner that this microfluidic chip is in a stable situation that become unstable when a small perturbation occurs. When the situation is unstable, a balance deviation is generated.

Such a device, that can be called "pico-injector", is controllable, reproducible and specific. Indeed, the system is controllable because it can be decided or not to release of a volume of the first fluid. Besides, the system is reproducible because the release volume is always the same for a given regime determined, inter alia, by a given flow rate, a fixed size of droplet, a given auxiliary channel and given dimensions of channels. Lastly, the system is specific because the release is precise.

Furthermore, the microfluidic chip is reusable thanks to the reliable stabilization of the second fluid interface even if the operation of the microfluidic device is stopped.

According to one option, the balance deviation with regard the balance condition at the second fluid interface can be generated by at least one droplet of the second fluid passing in the main channel between the first intersection and the second intersection, thereby increasing the pressure drop and triggering a release of a volume of the first fluid from the second fluid interface.

The passage of a drop between the first intersection and the second intersection generates a disturbance which means that the system has moved away from the balance condition. Under the condition of a disturbance large enough, there is a release of a volume (e.g. droplet) of the first fluid into the main channel.

This microfluidic device makes it possible to define a balance/unbalance condition, so that a disturbance induced by to the passage of drops between the first orifice and the second orifice is enough to trigger the release of a volume of the first fluid into the main channel. Therefore, the operation is purely passive, no active component is involved. Such system is thus very cost-effective.

According to one option, the balance deviation with regard the balance condition at the second fluid interface can be generated by an actuator allowing a release of a volume of the first fluid from the second fluid interface.

Thereby, the release is controlled by the selective activation of the actuator, this activation can be generated by a software. Reliable and conditional control is thus possible.

According to one option, the actuator can be a piezoelectric actuator interacting directly or indirectly with the auxiliary channel, preferably with ultrasonic vibrations.

Such piezoelectric actuator is easy to control and efficient. Such piezo actuator can be integrated in a microchip configuration directly on the substrate.

According to one option, the actuator can be acting on a deformable membrane arranged in the auxiliary channel which, when pressed, triggers a release of a droplet from the second fluid interface.

According to one option, one or more pair of electrodes can be positioned along the main channel at the second intersection or downstream to create an electric field inside the main channel and provoke a coalescence of a droplet of the first fluid with a droplet of the second fluid.

The electrodes are easy to position and to control. Coalescence is triggered selectively by the activation of said electrodes.

According to one aspect, when no droplet can circulate in the main channel, the first fluid interface having a first and a second radii of curvature and the second fluid interface having a third and fourth radii of curvature, are sized to respect the formulae:

$$Q*R_L*L_{AB} < 2\gamma*\left(\frac{1}{h} + \frac{1}{w} - \frac{1}{h'} - \frac{1}{w'}\right)$$

Wherein:
Q corresponds to the flow rate in the main channel;
$R_L$ corresponds to a lineic hydraulic resistance of the main channel;
$L_{AB}$ corresponds to a distance between the first intersection and the second intersection;
γ corresponds to the interfacial tension between the first fluid and the carrier fluid;
h' corresponds to the first radius of curvature of the first fluid interface;
w' corresponds to the second radius of curvature of the first fluid interface;
h corresponds to the third radius of curvature of the second fluid interface;
w corresponds to the fourth radius of curvature of the second fluid interface;

Thanks to this geometrical condition, the system is stable when no droplet of the second fluid circulates in the main channel.

According to one aspect, when one or more droplets can circulate between the first intersection and the second intersection, the first fluid interface having a first and a second radii of curvature and the second fluid interface having a third and fourth radii of curvature, are sized to respect the formulae:

$$[L_{AB} + (\alpha-1)*n*L_{drop}]*Q*R_L < 2\gamma*\left(\frac{1}{h} + \frac{1}{w} - \frac{1}{h'} - \frac{1}{w'}\right)$$

Wherein:
Q corresponds to the flow rate in the main channel;
$R_L$ corresponds to a lineic hydraulic resistance of the main channel;
$L_{AB}$ corresponds to a distance between the first intersection and the second intersection;
α corresponds to a constant;
n corresponds to the number of droplets of the third fluid circulating between the first intersection and the second intersection;
$L_{drop}$ corresponds to the length of a droplet of the third fluid circulating between the first intersection and the second intersection;
γ corresponds to the interfacial tension between the first fluid and the carrier fluid;
h' corresponds to the first radius of curvature of the first fluid interface;
w' corresponds to the second radius of curvature of the first fluid interface;
h corresponds to the third radius of curvature of the second fluid interface;
w corresponds to the fourth radius of curvature of the second fluid interface;

When a fluid circulate in a two branches configuration, the flow ratio between the two branches is set by the ratio between each branch resistance to fluid flow. Setting the geometrical parameter of each channel can change the flow ratio between the two channels. If a second fluid, non-miscible with a first fluid, is present in one branch, two meniscus will separate the second fluid from the first one. Each meniscus is able to maintain a pressure drop. By setting the size of each meniscus with channel geometrical parameters, it is possible to generate a stable situation, that prevents stream in the second channel. It is possible to set the parameters so that this situation is stable and became unstable with a small perturbation (stream occurs in the second channel).

The above inequality determines the balance condition for having no release of a volume of the first fluid into the main channel, when one or more droplets of the second fluid passing between the first intersection and the second intersection. In such case, for having a release of a volume of the first fluid into the main channel, an actuator is necessary.

According to one aspect, when the balance deviation with regard the balance condition at the second fluid interface can be generated by one droplet of the second fluid passing in the main channel between the first intersection and the second intersection, thereby increasing the pressure drop and triggering a release of a volume of the first fluid from the second fluid interface, when one droplet can circulate between the first intersection and the second intersection, and the first fluid interface having a first and a second radii of curvature and the second fluid interface having a third and fourth radii of curvature, are sized to respect the formulae:

$$Q*R_L*L_{AB} < 2\gamma*\left(\frac{1}{h} + \frac{1}{w} - \frac{1}{h'} - \frac{1}{w'}\right) < [L_{AB} + (\alpha-1)*L_{drop}]*Q*R_L$$

The above inequality determines the balance condition to respect for having a release of a volume of the first fluid into the main channel when one or more droplets go through the second intersection, when no actuator is used.

According to one option, a pressure drop in the main channel between the first intersection and the second intersection can be increased by a cross-section restriction of the main channel arranged between the first intersection and the second intersection, preferably just upstream the second orifice.

The cross-section restriction of the main channel generates an overpressure (i.e. increase the pressure drop) and this allows a droplet passing at the cross-section restriction in the main channel to reliably trigger a release of the desired volume from the second fluid interface. Whenever the cross-section restriction is close to the second intersection, the droplet of the first fluid delivered from the second interface will travel with the droplet of the second fluid in the main channel. The cross section restriction of the main channel also allows to realize a tracking of the droplet of the main channel, by monitoring the pressure at a location between the first intersection and the second intersection.

According to one option, wherein the auxiliary channel has a funnel shape arranged at the vicinity of the second orifice and converging towards the second orifice.

When the operation of the microfluidic device is stopped, the pressures between the first orifice and the second orifice balance. Thanks to the funnel shape, the second fluid interface remains at the vicinity of the second intersection and does not move back substantially. The funnel shape is such that first and second radii of curvature at the first fluid interface come to take the same size as the third and fourth radii of curvature at the second fluid interface.

Furthermore, when the microfluidic device is put back into operation, a pressure gradient will be created which will cause the third and fourth radii of curvature to progress again so as to balance again the pressures at the second orifice.

The funnel shape can have an aperture angle comprises between 40° and 160°.

According to one option, there can be provided next to the first orifice a reduced section at the entrance of the auxiliary channel.

The reduced section at the entrance of the auxiliary channel prevents one or more droplet of the second fluid passing through the main channel from entering the auxiliary channel. Only carrier fluid can enter the auxiliary channel.

It is necessary to have a little of the carrier fluid in the reduced section. It is also necessary to have a first and second large radii of curvature at the first fluid interface. Thus, if the first fluid rises to the level of the second orifice, this must not rise to the reduced section. Finally, the resistance at the auxiliary channel will change when the first fluid will empty. If the resistance at the first orifice is very large compared to the resistance of the auxiliary channel, the change in resistance will be limited. The injection reproducibly throughout the life of the product will be better.

Thanks to the cross-section restriction of the main channel arranged, the funnel shape of the second orifice and the reduced section next to the first orifice, the rate of fluid injection at the second orifice depends on the ratio of the resistances between the first and second orifice through the main channel and between the first and second orifice through the auxiliary channel. This specific geometry makes it possible to manage the hydraulic resistance of the auxiliary channel and to balance this ratio.

According to one option, one monitoring element can track at least one droplet circulating between the first intersection and the second intersection.

Such monitoring element allows to know exactly when to activate the actuator, in case of using it. It also allows to control the smooth functioning of the pico-injector.

According to one option, the monitoring element can be formed as a pressure sensor for measuring a pressure prevailing at a location between the first intersection and the second intersection for controlling the operation of the device.

According to one option, the monitoring element can be formed as a capacitive sensor for determining a droplet passage in the main channel between the first intersection and the second intersection for controlling the operation of the device.

According to one option, there may be provided a surfactant compound in the carrier fluid and/or in the droplets of the second fluid.

The surfactant compound change the interfacial tension of the second fluid interface and the first fluid interface when the surfactant compound is injected in the carrier fluid. It allows to adjust the operational range of the system and the release of a volume of the first fluid into the main channel.

According to one option, there may be provided one or more further auxiliary channel(s), each formed as a further reservoir having a predefined closed volume, fluidly coupled to the main channel at two further intersections wherein the auxiliary channel connects to the main channel.

The serial configuration of pico-injector allows to inject several products and release a controlled volume of different fluids into the main channel.

According to one option, the carrier fluid can be oil, for instance mineral oil. The first fluid can be a reagent configured to detect an analyte contained in the second fluid. The second fluid can be a urine sample to be analyzed.

The present disclosure further promotes a method of releasing one or more droplets of a first fluid with one or more droplets of a second fluid within a microfluidic apparatus wherein the method comprises:
  Providing a main channel carrying one or more droplets of the second fluid immersed in the carrier fluid,
  Providing an auxiliary channel, formed as a reservoir having a predefined closed volume, fluidly coupled to the main channel at two intersections, with a first intersection via a first orifice configured to create a first fluid interface between the carrier fluid and the first fluid in the auxiliary channel, and with a second intersection downstream to the first intersection via a second orifice configured to create a second fluid interface between the carrier fluid and the first fluid,
  Imparting a flow of the carrier fluid into the main channel, inducing therefrom a difference of pressure between the first and second orifice generating a balance condition such that a meniscus of the second fluid interface is maintained in the auxiliary channel, at the vicinity of the second orifice,
  Creating a balance deviation, with regard to the balance condition, greater than a predefined threshold, thereby triggering a release of a volume of the first fluid from the second interface into the main channel.

DETAILED DESCRIPTION

The present document promotes a device for delivering one or more release of a controlled volume of a first fluid with one or more droplets of a second fluid into a main channel with the use of a microfluidic device having micro-channels at a range from micrometer to millimeter. The micro-channels are treated in order to be hydrophobic. The micro-channels need to be hydrophobic when the carrier fluid is hydrophobic. However, the carrier fluid can also be hydrophilic and in such case, the micro-channels are hydrophilic. H This microfluidic device can work at ambient temperature or at another temperature.

Figure 7:
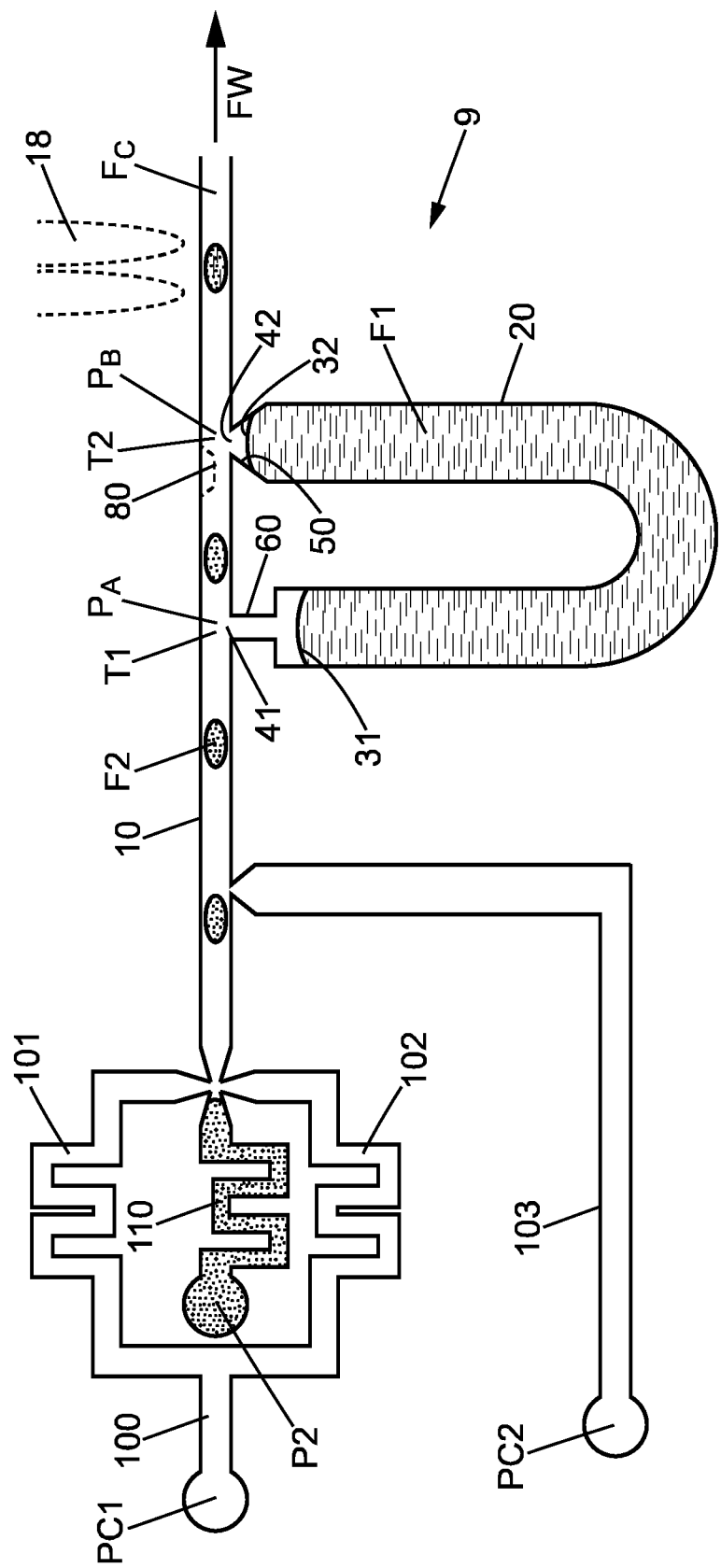
FIG. 7 illustrates an enlarged view of the microfluidic system.

As shown at FIG. 7, there is provided one or two pumps PC1, PC2 to circulate a carrier fluid denoted FC into a main channel denoted 10. Further, there is provided one pump P2 to release drop of a second fluid F2 into the main channel 10. The system composed of the pumps PC1 and P2 is classically a flow focusing geometry. This flow focusing is an example of generation of droplets. In another embodiment, this flow focusing could be replaced by a T junction, a co flow or another system. This flow focusing geometry allows to create droplets of the second fluid with small size and small spacing between two consecutive droplets. Two lengthening channels 101, 102, 110 increase hydraulic resistance of each channel by extending the length of each channel. Thus, the change in hydraulic resistance when a droplet of the second fluid is formed is negligible. The pump PC2 and the channel 103 allow to space two consecutive droplets of the second fluid F2 and increase the flow rate by injecting a quantity of carrier fluid into the main channel.

The second fluid F2 is non-miscible with carrier fluid FC, therefore the second fluid F2 remains as droplets along their path within the laminar flow of the carrier fluid. In the illustrated example the carrier fluid is an oil, for instance mineral oil. The second fluid F2 is for example a body fluid. Here we consider in particular the case where the second fluid is a urine sample of a human individual. However, the second fluid can be a urine sample of an animal (veterinary usage). Also, the second fluid can be lymph, fresh blood, saliva, sweat, or any type of body fluids.

Basically, the promoted arrangement can be used for any biological analysis. Besides, the promoted arrangement can be used for any frame of any chemical process requiring a precise injection of a compound/species in another compound/species.

Figure 1:
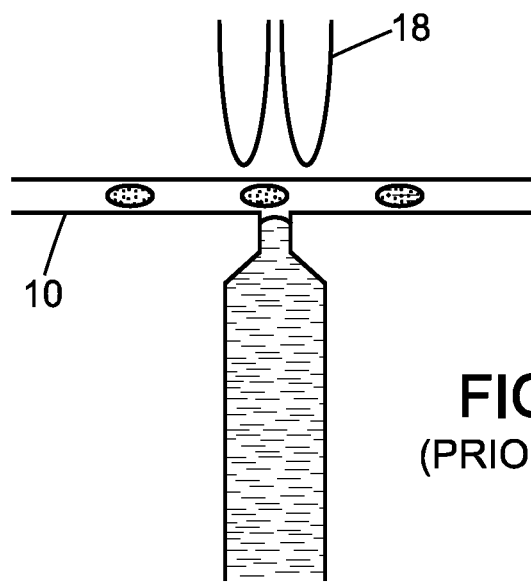
FIG. 1 represents a pico-injector according to the prior art.
Figure 2:
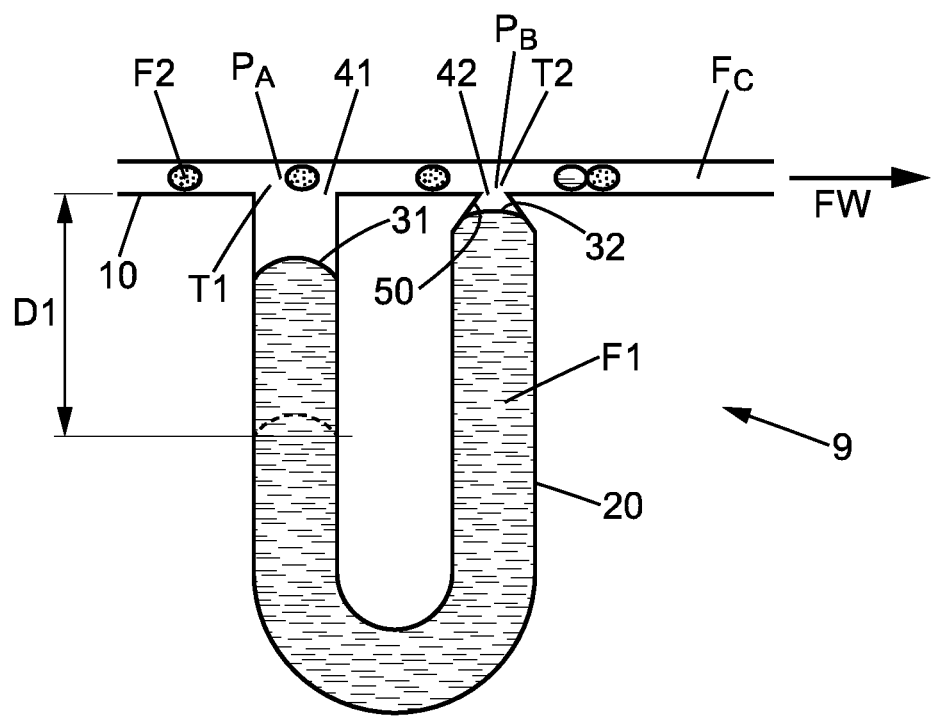
FIG. 2 represents a pico-injector according to the invention.

As illustrated in FIGS. 2 and 7, the pico-injector device 9 comprises the abovementioned main channel 10 in which circulates a carrier fluid FC having a flow direction FW and an auxiliary channel 20 that will be discussed later on.

Within the main channel, the flow velocity is comprised between 0.001 mm/s and 10 mm/s, preferably between, 0.2 mm/s and 1 mm/s. The conditions are such that the flow is laminar.

The main channel and all other channels described herein can be micro-machined conduits realized in a substrate. Alternately, the main channel and all other channels described herein can be part of a silicon miniature system-on-a-chip.

Nominal cross section of the main channel can be comprised between 10 $\mu m^2$ and 1 mm.

The transverse section exhibits in the illustrated example a rectangle shape (with width and height). However, a rounded shaped transverse section or any other basic transverse sectional shape is also encompassed within the present disclosure.

The carrier fluid carries one or more droplets of the second fluid F2. The pico-injector 9 also comprises an auxiliary channel 20 formed as a reservoir containing a predefined closed volume V1 of a first fluid F1.

The first fluid F1 can be a reactant intended for a chemical reaction when brought in presence of a particular compound contained in the second fluid F2. This first fluid F1 is non miscible with the carrier fluid FC. This first fluid F1 can be all type of reagent able to interact and detect glucose, proteins, ketones or hormones such as LH and HCG contained in the second fluid F2.

This auxiliary channel 20 is fluidly coupled to the main channel at two intersections T1,T2. More precisely, the auxiliary channel 20 is connected to a first intersection T1 via a first orifice 41. Within the auxiliary channel, at immediate vicinity of the first orifice or at a certain distance D1 of the first orifice 41 (according to the progressive consumption of the first fluid along time), we find a first fluid interface 31 between the carrier fluid FC and the first fluid F1.

The auxiliary channel is also connected to a second intersection T2 downstream to the first intersection, via a second orifice 42. Within the auxiliary channel, at immediate vicinity of the second orifice 42, we find a second fluid interface 32 between the carrier fluid and the first fluid. We note here that when pump PC1 and/or PC2 stops, the second fluid interface 32 remains at vicinity of the second orifice 42 for reasons explained further below.

The auxiliary channel has an overall U shape and the first and second intersection are in the same side of the main channel. However, it is possible to have the first intersection on one side of the main channel and the second intersection on the other side of the main channel. In this case, the auxiliary channel does not exhibit a U shape. Besides, the second orifice 42 has a funnel shape 50 in the auxiliary channel, converging toward the second orifice.

We note here that influence of gravity is negligible.

When the microfluidic device is operating, the second fluid interface 32 is maintained in the auxiliary channel, at the vicinity of the second orifice by pressure balance, which is allowed thanks to the particular geometry of the system. Indeed, a flow of the carrier fluid induces a difference of pressure ($P_A-P_B$) between the first and second orifice generating a balance condition.

The quantity of the first fluid in the reservoir formed by auxiliary channel decreases gradually after multiple releases of a volume of the first fluid; the loss of volume of the first fluid is somewhat proportional to the effective operation of the device.

Thanks to the promoted arrangement, the loss of volume provokes a move of the meniscus at the first fluid interface 31. More precisely, said first fluid interface moves away from the first orifice 41 tantamount the said loss of volume. But the meniscus at the second fluid interface 32 stays substantially at the vicinity of the second orifice. In other words, the distance D1 multiplied by the cross sectional area of the auxiliary channel represents the loss of volume.

Under nominal operation, i.e. when carrier fluid circulates in the main channel, this difference of pressure ($P_A-P_B$) pushes the first fluid interface 31 away from the main channel.

When the operation of the microfluidic device is stopped, the respective pressures at the first orifice and at the second orifice are equal.

A funnel shape 50 is provided in the auxiliary channel, at the second orifice 42, the funnel shape converging towards the second orifice.

Advantageously, the first and second radii of curvature R1,R2 at the first fluid interface come to take the same size as the third and fourth radii of curvature R3,R4 at the second fluid interface.

Furthermore, when the microfluidic device is put back into operation (activation of pump PC1 and/or PC2), a pressure gradient is generated as mentioned before, which causes the third and fourth radii of curvature to change again so as to balance again the pressures at the second orifice.

The condition so that the second fluid interface of the first fluid remains at the level of the main channel without leakage is determined below.

First, the case without droplets of the second fluid F2, i.e. only the carrier fluid FC flows through the main channel 10, is studied.

On the one hand, the pressure drop in a channel where a fluid circulates at a flow rate Q is equal to the hydraulic resistance of the channel R multiplied by the flow rate: Δ=Q×R.

The hydraulic resistance of a microfluidic channel depends on its dimensions, as well as on the viscosity η of the fluid flowing there. For example, for a rectangular section channel of height h and width w, the linear hydraulic resistance can be approximated by:

$$R_L = \frac{12*\eta}{\left[1 - 0.63*\left(\frac{h}{w}\right)\right]*h^3*w}$$

In the pico-injector illustrated in FIG. 2, there is a pressure drop between the first intersection and the second intersection:

$$P_A - P_B = Q \times R_L \times L_{AB}$$

wherein:
$P_A$ corresponds to the pressure at the first intersection;
$P_B$ corresponds to the pressure at the second intersection;
Q corresponds to the flow rate in the main channel;
$R_L$ corresponds to a lineic hydraulic resistance of the main channel;
$L_{AB}$ corresponds to a distance between the first intersection and the second intersection.

On the other hand, classically, there is a pressure difference at the crossing of an interface between two fluids. This is the Laplace pressure, the expression of which is given by the surface tension coefficient γ (N·m$^{-1}$) and the main curvatures of the surface R1 and R2:

$$\Delta P = \gamma \left(\frac{1}{R_1} + \frac{1}{R_2}\right)$$

Figure 8:
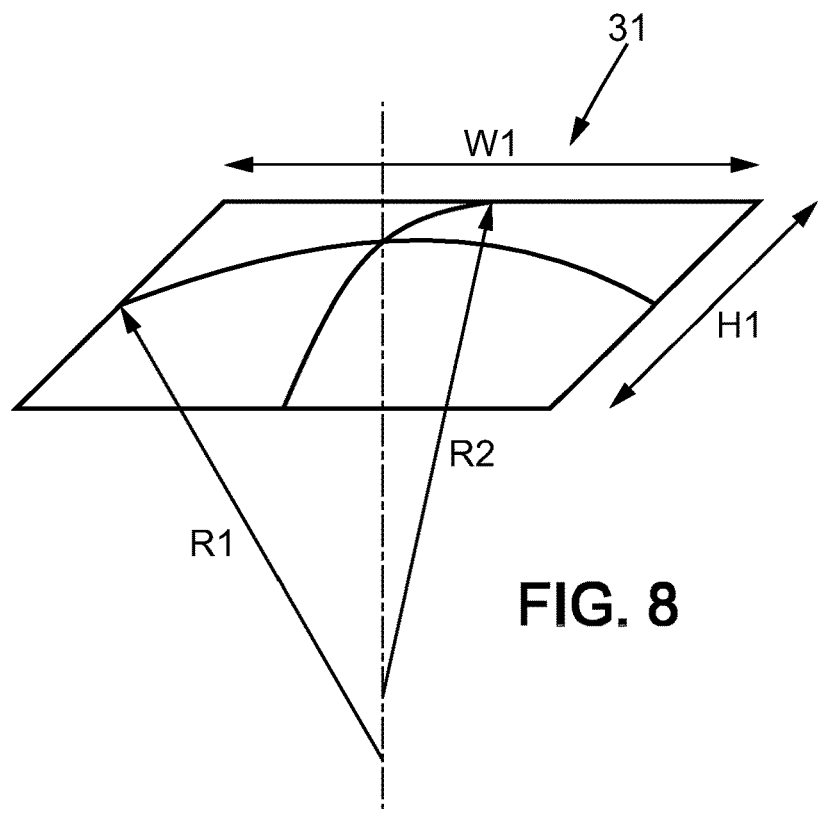
FIG. 8 and FIG. 9 illustrate respectively first and second fluid interface where a meniscus takes place.
Figure 9:
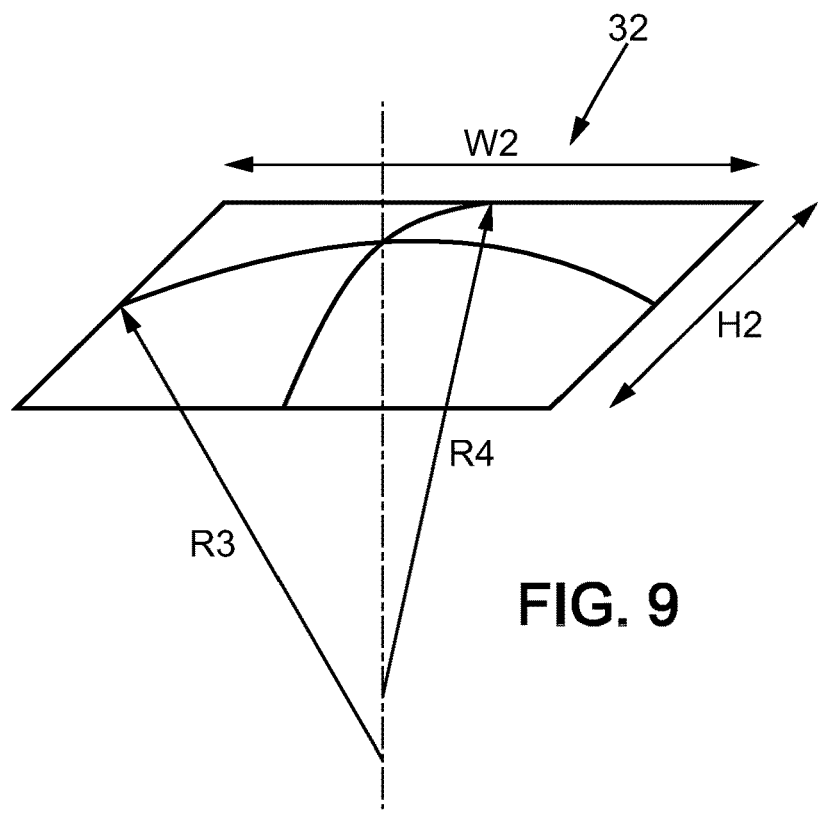

As illustrated in FIG. 2, there are two interfaces between the first fluid and the carrier fluid. In the case of a rectangular section, R1 cannot be less than half of the height H1 of the channel while R2 cannot be less than half of the width W1, as illustrated in FIG. 8. Thus, considering the limit case for the two radii of curvature, the pressures at the first intersection, the second intersection and within the first fluid are linked by the relations:

$$(P_C - P_B)_{max} = 2\gamma*\left(\frac{1}{h} + \frac{1}{w}\right), (P_C - P_A)_{max} = 2\gamma*\left(\frac{1}{h'} + \frac{1}{w'}\right) \text{ and}$$

$$P_A - P_B = Q * R_L * L_{AB},$$

wherein:
$P_C$ corresponds to the pressure within the first fluid, in the auxiliary channel;
γ corresponds to the interfacial tension between the first fluid and the carrier fluid;
h' corresponds to a first radius of curvature R1 of the first fluid interface;
w' corresponds to a second radius of curvature R2 of the first fluid interface;
h corresponds to a third radius of curvature R3 of the second fluid interface with regard the height H2 of the channel, as illustrated in FIG. 9;
w corresponds to a forth radius of curvature R4 of the second fluid interface with regard the width W2, as illustrated in FIG. 9;

Consequently, the first fluid does not leak in the main channel if the following condition is satisfied:

$$Q * R_L * L_{AB} < 2\gamma * \left(\frac{1}{h} + \frac{1}{w} - \frac{1}{h'} - \frac{1}{w'}\right)$$

A volume of the first fluid from the second fluid interface into the main channel is released only when a balance deviation prevails with regard to the balance condition.

In one embodiment, the balance deviation with regard the balance condition at the second fluid interface is generated by at least one droplet of the second fluid F2 passing in the main channel between the first intersection and the second intersection.

According to one example, the volume is released before the passage of the at least one droplet at the vicinity of the second intersection and when this at least one droplet is between the first and second intersection.

According to another example, the volume is released during the passage of the at least one droplet at the level of the second intersection.

According to another example, the volume is released just after the passage of the at least one droplet at the vicinity of the second intersection, when the at least one droplet is localized just downstream to the second intersection.

The conditions allowing the progression of the second fluid interface when a droplet passes into the second intersection, is explained below.

Figure 6:
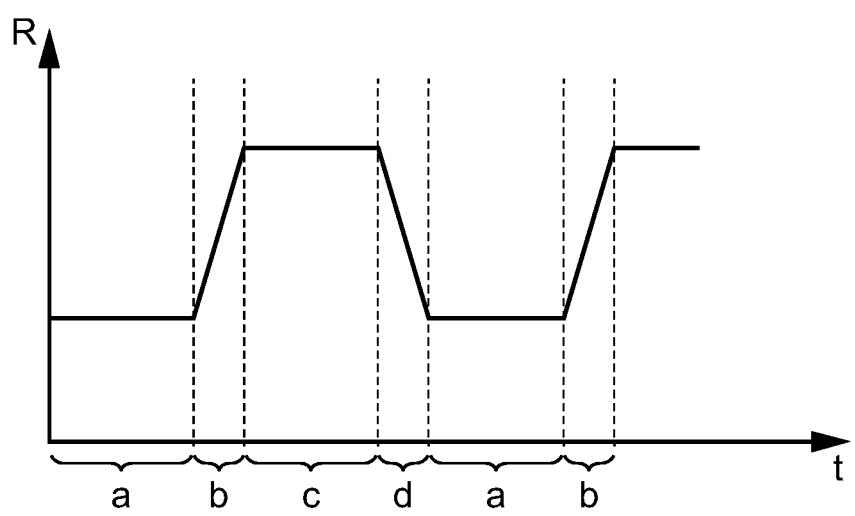
FIG. 6 represents the evolution of the hydraulic resistance of the main channel versus the time according to the invention.

In the case of a two-phase flow, as illustrated in FIG. 6, the resistance between the first intersection and the second intersection is no longer constant: the passage of a droplet producing an overpressure.

Indeed, the hydraulic resistance of the main channel between the first intersection and the second intersection is varying as a function of time. In a first time a, there is only carrier fluid between the first intersection and the second intersection: the pressure drop is minimized, the third and fourth radii of curvature of the second fluid interface are relatively high. In a second time b, a droplet of the second fluid arrives at the first intersection, the hydraulic resistance of the channel increases causing an increase in the pressure drop between the first intersection and the second intersection: the second fluid interface progress in the auxiliary channel and deforms to take a smaller radius of curvature. In a third time c, the droplet of the second fluid is entirely between the first intersection and the second intersection. In a fourth time d, the droplet of the second fluid passes at the level of the second orifice: it is the moment of a release of a volume of the first fluid from the second fluid interface into the main channel. The release of volume of the first fluid from the second fluid interface into the main channel can thus be modified by varying the flow rate, the size or the frequency of the droplets of the second fluid. A monitoring element 96 such as a pressure sensor or a capacitive sensor can be used to track at least one droplet circulating between the first intersection and the second intersection. The pressure sensor can be placed along the main channel. The capacitive sensor can be placed facing the main channel and measured the variation of the capacity determining when at least one droplet of the second fluid cross the second orifice. Other sensors can also be used to track the at least one droplet circulating between the first intersection and the second intersection.

A good approximation of the pressure drop in the main channel when passing a droplet is as follows:

$$\Delta P_{drop} = Q * R_L * [L_{AB} + (\alpha - 1) * n * L_{drop}]$$

wherein:

$L_{drop}$ is the length of a droplet of the second fluid which is strictly inferior to $L_{AB}$;

n is the number of droplets between the first intersection and the second intersection;

α is comprises between 1 and 10.

Thus, the second fluid interface progress without the leaking of the first fluid in the main channel provided that:

$$[L_{AB} + (\alpha - 1) * n * L_{drop}] * Q * R_L < 2\gamma * \left(\frac{1}{h} + \frac{1}{w} - \frac{1}{h'} - \frac{1}{w'}\right).$$

In other words, at the level of the second orifice, there is a limiting meniscus. That is to say that geometrically, from the moment the diameter of the meniscus is equal to the diameter of the second orifice, if one continues to push, instead of continuing to decrease, the meniscus size begins to increase: a limit point is crossed. The system is used in order to be not far from this limit point but to remain stable. To remain stable, it implies not to go until the diameter of the meniscus begins to increase again, corresponding to the moment when the system passes from a stable system to an unstable one. The system is set up just below this balance condition, called distance to imbalance.

The operating range of a pico-injector, as illustrated in FIG. 2, depends on the dimensions of the microfluidic channels, and on the nature of the fluids used. Thus, the choices made can correspond to a wide range of flow rates for which the system operates. This solution works for a micro-system, that is to say with characteristic dimensions of the order of 1 μm to 1 mm, with flow velocities of the order of 1 μm/s to 1 cm/s, i.e. flow rates of the order of a few fL/s to a few mL/s. Below this range, the release of a volume of the first fluid in the main channel is impossible. Above this range, the microfluidic regime is exited.

In the absence of droplets of the second fluid, the hydraulic resistance between A and B is equal to:

$$R = \frac{12 * 10 * 10^{-3} * 500 * 10^{-6}}{\left[1 - 0.63 * \left(\frac{50 * 10^{-6}}{60 * 10^{-6}}\right)\right] * (50 * 10^{-6})^3 * 60 * 10^{-6}} = 1.0 * 10^{13} \text{ Pa·s·m}^{-3}.$$

Thus, for the system to be stable and the second fluid not to leak in the absence of droplets of the second fluid, the flow rate Q has to be:

$$Q < \frac{2 * 20 * 10^{-3} * \left(\frac{1}{50 * 10^{-6}} + \frac{1}{25 * 10^{-6}} - \frac{1}{50 * 10^{-6}} - \frac{1}{150 * 10^{-6}}\right)}{1.0 * 10^{13}} =$$

$$1.3 * 10^{-10} \text{ m}^3 \cdot \text{s}^{-1} = 130 \text{ nL·s}^{-1}$$

It is now considered that droplets of the second fluid circulate in the main channel, that they have a $L_{drop}$ length of 100 μm and that they are spaced more than 300 μm. Thus, there is at most a single droplet between the first intersection and the second intersection. Considering that α=5, the hydraulic resistance between the first intersection and the second intersection is equal to:

$$R = \frac{(300 - 100) * 10^{-6}}{300 * 10^{-6}} * 1.0 * 10^{13} + \frac{100 * 10^{-6}}{300 * 10^{-6}} * 5 * 1.0 * 10^{13} =$$

$$2.3 * 10^{13} \text{ Pa·s·m}^{-3}$$

Thus, for the system to be stable and the second fluid not to leak when a drop passes, we must have:

$$Q < \frac{2 * 20 * 10^{-3} * \left(\frac{1}{50 * 10^{-6}} + \frac{1}{25 * 10^{-6}} - \frac{1}{50 * 10^{-6}} - \frac{1}{150 * 10^{-6}}\right)}{2.3 * 10^{13}} =$$

$$5.7 * 10^{-11} \text{ m}^3 \cdot \text{s}^{-1} = 57 \text{ nL·s}^{-1}$$

Figure 3:
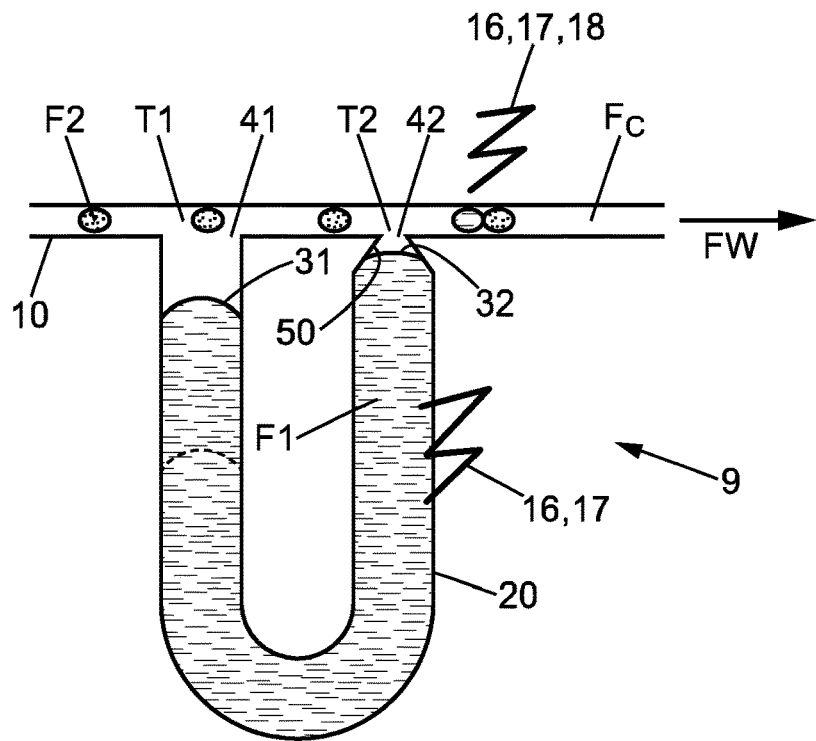
FIG. 3 represents a pico-injector with actuator and electrodes according to the invention.

In another embodiment, as illustrated in FIG. 3, an actuator 16 is added at the vicinity of the auxiliary channel. This actuator is acting as a deformable membrane arranged in the auxiliary channel.

Figure 10:
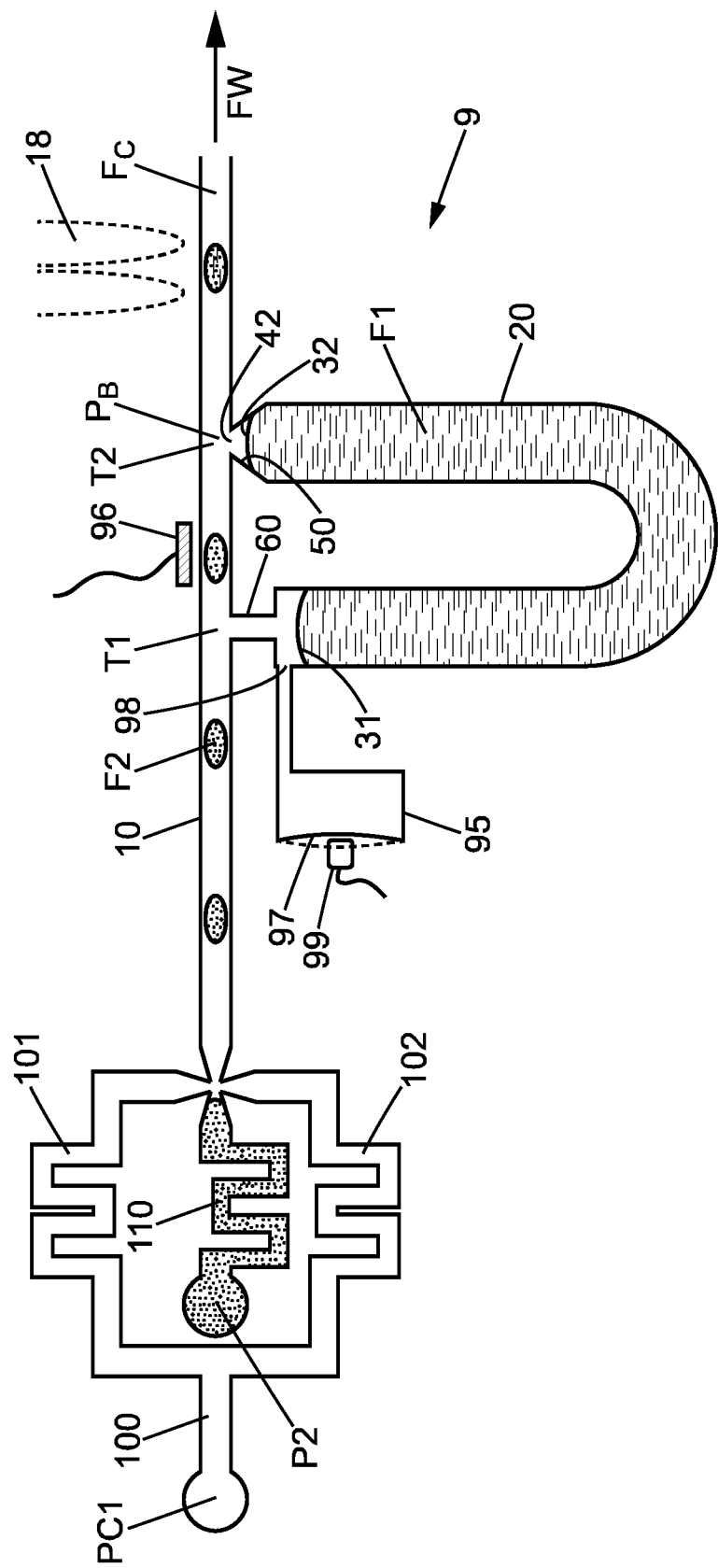
FIG. 10 illustrates an enlarged view of a variant microfluidic system with a deformable membrane and a sensor.

As illustrated in FIG. 10, there is provided a side pocket 95 in fluid communication with the auxiliary channel at a position upstream of the first fluid interface. The side pocket is directly fixed to the auxiliary channel in an hermetic manner through the orifice 98.

Further, there is provided deformable membrane 97 formed as one flexible side wall of the side pocket. The side pocket 95 is filled with carrier fluid FC.

The volume of the carrier fluid inside the side pocket 95 that can be pushed out of the side pocket when the side pocket is pressed is comprised between 0.1 μL and 10 μL.

In another embodiment, the side pocket 95 could also be localized directly in the auxiliary channel between the first fluid interface and the second fluid interface. In such case, the side pocket 95 is filled by the first fluid F1.

In should be noted that the side pocket can have different shapes: either a cube, or a ball, or another form.

The material constituting the deformable membrane is flexible and allows the membrane to reduce the volume of the side pocket 95 or the auxiliary channel when pressed. The thickness of the membrane is comprised between 1 μm and 50 mm.

When the deformable membrane is pressed by actuating an actuator 99, a portion of the fluid contained in the side pocket 95 or the auxiliary channel is pushed out of the cavity or the auxiliary channel provoking the release of a volume of the first fluid at the second orifice, into the main channel.

The monitoring element 96 allows the tracking of at least one droplet between the first orifice and second orifice. When this monitoring element notice that one droplet arriving to the second orifice, the deformable membrane is pressed to release a volume of the first fluid into the main channel.

This actuator can also be a piezoelectric actuator 17 interacting directly or indirectly with the auxiliary channel, preferably with ultrasonic vibrations. This ultrasonic vibrations generates radiation pressure disturbing the second fluid interface.

When the actuator is activated, a release of a droplet from the second fluid interface is allowed/triggered. This actuator is another manner to generate a balance deviation with regard the balance condition.

Therefore, the pico-injector can either be passive, or requiring an external system such as an actuator.

According to one option, there are provide electrodes 18 positioned along the main channel, just downstream to the second intersection The electrodes are used to create an electric field inside the main channel and provoke a coalescence of a droplet of the first fluid with a droplet of the second fluid.

Depending on the nature of fluids F1,F2 to be brought together, the coalescence may happen passively, i.e. without any electric field actuation, just by bringing a droplet of the first fluid at effective contact with a droplet of the second fluid. A surfactant present in the carrier fluid can help this passive coalescence.

Figure 4:
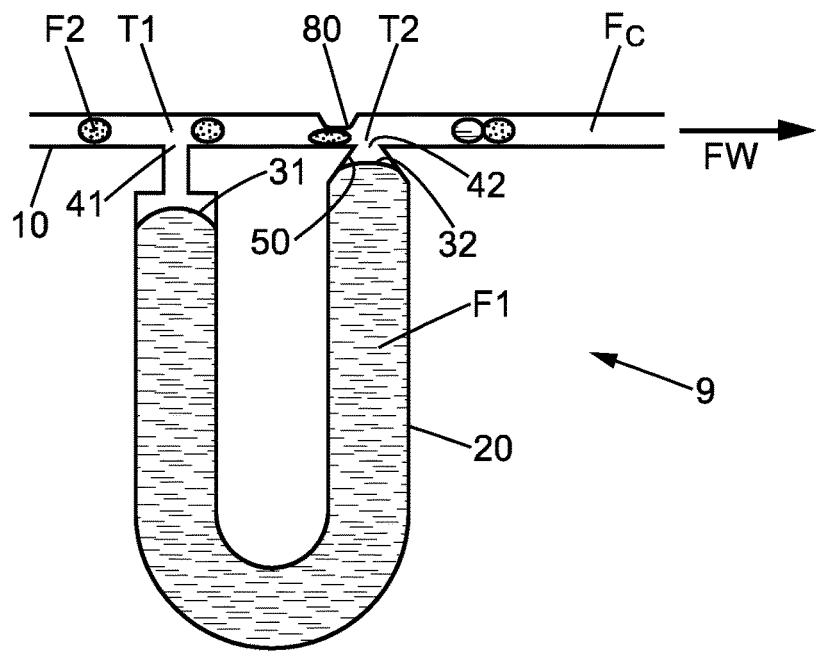
FIG. 4 represents a pico-injector according to a second embodiment.

In another embodiment, as illustrated in FIG. 4, a cross-section restriction 80 of the main channel is arranged between the first intersection and the second intersection, preferably just upstream the second orifice. Besides, next to the first orifice, a reduced section 60 at the entrance of the auxiliary channel is provided.

The cross-section restriction 80 of the main channel generates an overpressure and this allows the droplet of the main channel passing at the second intersection and the droplet released from the first fluid interface to travel together. This cross section restriction of the main channel also allows to realize a tracking of the droplet of the main channel.

The reduced section 60 at the entrance of the auxiliary channel, i.e. at the first orifice 41, prevents one or more droplet passing through the main channel from entering the auxiliary channel. Only the carrier fluid FC passes through reduced section 60.

The reduced section 60 can also prevent some first fluid to flow back to the main channel, whenever this condition could occur.

The hydraulic resistance of the reduced section 60 does not depend on the position of the meniscus at the first fluid interface, this hydraulic resistance is irrespective of D1 value, it remains steady along the loss of volume of the first fluid.

Figure 5:
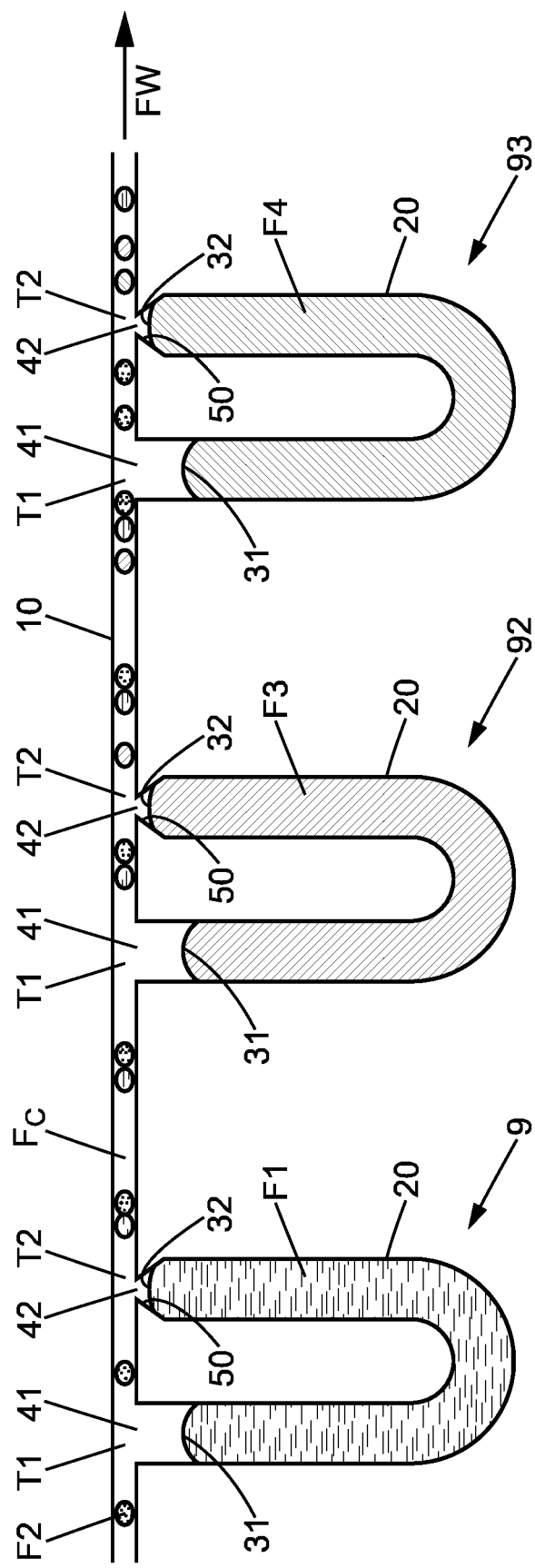
FIG. 5 represents a system of pico-injectors in series according to the invention.

In another embodiment, as illustrated in FIG. 5, the microfluidic apparatus can further comprises at least a further auxiliary channel 92, similar to the first auxiliary channel 9. It can have more than two auxiliary channel, for instance three as illustrated in FIG. 5. Each auxiliary channel 9, 92, 93 are formed as a reservoir having a predefined closed volume, fluidly coupled to the main channel at two intersections, downstream to the second intersection of the first auxiliary channel and connected to the main channel.

The second auxiliary channel 92 houses a third fluid F3; the third auxiliary channel 93 houses a fourth fluid F4.

Such microfluidic apparatus can be used to inject several products in serial configuration in order to release a controlled volume of different fluids. However, the different auxiliary channel can be arranged in parallel configuration also. The auxiliary channels can be as illustrated in FIG. 5 or being a composition of a pico-injector as illustrated in FIG. 2 and/or a pico-injector as illustrated in FIG. 3, and/or a pico-injector as illustrated in FIG. 4.

A surfactant compound can be added in the carrier fluid and/or in the droplets of the second fluid. By modifying the interfacial tension, it helps on customizing and playing on the conditions for having the second fluid interface at the vicinity of the second orifice without leaking into the main channel. Various types of surfactants are possible: Span® 80 (a nonionic surfactant) Tween® 20 (a polyethylene glycol sorbitan monolaurate) or Tween® 80 (a polyethylene glycol sorbitan monooleate). Other classical surfactants not mentioned are also possible.

It should be noted, that although the carrier fluid above is an oil and the second fluid an aqueous solution, the converse configuration is also contemplated, namely an aqueous solution as carrier fluid and an oily solution as second fluid.

The height of the auxiliary channel can be different from that of the main channel. For instance, the auxiliary channel can be larger to allow to store a larger volume of fluid and thus increase the duration of use of the system, for example.

There is no influence of gravity on what is described above, the hydrostatic pressure can be neglected with regard the other physical quantities such as capillarity and loss of hydraulic head.

The invention claimed is:

1. A microfluidic apparatus with a controlled system for delivering one or more release of a volume of a first fluid with one or more droplets of a second fluid comprising:
   a main channel, with a carrier fluid having a flow direction, the carrier fluid carrying one or more droplets of the second fluid immersed in the carrier fluid;
   an auxiliary channel, formed as a reservoir having a predefined closed volume of the first fluid, fluidly coupled to the main channel at two intersections wherein the auxiliary channel connects to:
   a first intersection via a first orifice of the auxiliary channel configured to create a first fluid interface between the carrier fluid and the first fluid in the auxiliary channel;
   a second intersection downstream to the first intersection via a second orifice of the auxiliary channel configured to create a second fluid interface between the carrier fluid and the first fluid;
   wherein a flow of the carrier fluid is configured to induce a difference of pressure between the first and second orifice generating a balance condition such that a meniscus of the second fluid interface is maintained in the auxiliary channel, at the vicinity of the second orifice; wherein a balance deviation, with regard to the balance condition, greater than a predefined threshold, triggers a release of a volume of the first fluid from the second fluid interface into the main channel.

2. The microfluidic apparatus according to claim 1, wherein the balance deviation with regard the balance condition at the second fluid interface is generated by at least one droplet of the second fluid passing in the main channel between the first intersection and the second intersection, thereby increasing the pressure drop and triggering a release of a volume of the first fluid from the second fluid interface.

3. The microfluidic apparatus according to claim 1, wherein the balance deviation with regard the balance condition at the second fluid interface is generated by an actuator 8-6) allowing a release of a volume of the first fluid from the second fluid interface.

4. The microfluidic apparatus according to claim 3, wherein the actuator is a piezoelectric actuator interacting directly or indirectly with the auxiliary channel.

5. The microfluidic apparatus according to claim 3, wherein the actuator is acting on a deformable membrane arranged in the auxiliary channel which, when pressed, triggers a release of a droplet from the second fluid interface.

6. The microfluidic apparatus according to claim 1, wherein one or more pair of electrodes are positioned along the main channel at the second intersection or downstream to create an electric field inside the main channel and provoke a coalescence of a droplet of the first fluid with a droplet of the second fluid.

7. The microfluidic apparatus according to claim 1, wherein, when no droplet circulates in the main channel, the first fluid interface having a first and a second radii of curvature and the second fluid interface having a third and fourth radii of curvature, are sized to respect the formulae:

$$Q * R_L * L_{AB} < 2\gamma * \left(\frac{1}{h} + \frac{1}{w} - \frac{1}{h'} - \frac{1}{w'}\right)$$

Wherein:
Q corresponds to the flow rate in the main channel;
$R_L$ corresponds to a lineic hydraulic resistance of the main channel;
$L_{AB}$ corresponds to a distance between the first intersection and the second intersection;
γ corresponds to the interfacial tension between the first fluid and the carrier fluid;
h' corresponds to the first radius of curvature of the first fluid interface;
w' corresponds to the second radius of curvature of the first fluid interface;
h corresponds to the third radius of curvature of the second fluid interface;
w corresponds to the fourth radius of curvature of the second fluid interface.

8. The microfluidic apparatus according to claim 1, wherein, when one or more droplets circulates between the first intersection and the second intersection, the first fluid interface a first and a second radii of curvature and the second fluid interface having a third and fourth radii of curvature, are sized to respect the formulae:

$$[L_{AB} + (\alpha - 1) * n * L_{drop}] * Q * R_L < 2\gamma * \left(\frac{1}{h} + \frac{1}{w} - \frac{1}{h'} - \frac{1}{w'}\right)$$

Wherein:
Q corresponds to the flow rate in the main channel;
$R_L$ corresponds to a lineic hydraulic resistance of the main channel;
$L_{AB}$ corresponds to a distance between the first intersection and the second intersection;
α corresponds to a constant;
n corresponds to the number of droplets of the third fluid circulating between the first intersection and the second intersection;
$L_{drop}$ corresponds to the length of a droplet of the third fluid circulating between the first intersection and the second intersection;
γ corresponds to the interfacial tension between the first fluid and the carrier fluid;
h' corresponds to the first radius of curvature of the first fluid interface;
w' corresponds to the second radius of curvature of the first fluid interface;
h corresponds to the third radius of curvature of the second fluid interface;
w corresponds to the fourth radius of curvature of the second fluid interface.

9. The microfluidic apparatus according to claim 1, wherein a pressure drop in the main channel between the first intersection and the second intersection is increased by a cross-section restriction of the main channel arranged between the first intersection and the second intersection.

10. The microfluidic apparatus according to claim 1, wherein the auxiliary channel has a funnel shape arranged at the vicinity of the second orifice and converging towards the second orifice.

11. The microfluidic apparatus according to claim 1, wherein there is provided next to the first orifice a reduced section at the entrance of the auxiliary channel.

12. The microfluidic apparatus according to claim 1, wherein one monitoring element tracks at least one droplet circulating between the first intersection and the second intersection.

13. The microfluidic apparatus according to claim 1, wherein there is provided a surfactant compound in the carrier fluid and/or in the droplets of the second fluid.

14. A microfluidic apparatus with a controlled system for delivering one or more release of a volume of a first fluid with one or more droplets of a second fluid comprising:
a main channel, with a carrier fluid having a flow direction, the carrier fluid carrying one or more droplets of the second fluid immersed in the carrier fluid;
an auxiliary channel, formed as a reservoir having a predefined closed volume, fluidly coupled to the main channel at two intersections wherein the auxiliary channel connects to:
a first intersection via a first orifice configured to create a first fluid interface between the carrier fluid and the first fluid in the auxiliary channel;
a second intersection downstream to the first intersection via a second orifice configured to create a second fluid interface between the carrier fluid and the first fluid;
wherein a flow of the carrier fluid is configured to induce a difference of pressure between the first and second orifice generating a balance condition such that a meniscus of the second fluid interface is maintained in the auxiliary channel, at the vicinity of the second orifice;
wherein a balance deviation, with regard to the balance condition, greater than a predefined threshold, triggers a release of a volume of the first fluid from the second fluid interface into the main channel, and
wherein the microfluidic apparatus further comprises one or more further auxiliary channels, each formed as a further reservoir having a predefined closed volume, fluidly coupled to the main channel at two further intersections wherein the auxiliary channel connects to the main channel.

15. The microfluidic apparatus according to claim 1, wherein the second fluid is a urine sample to be analyzed, wherein the carrier fluid is an oil, and wherein the first fluid is a reagent configured to detect an analyte contained in the second fluid.

16. A method of releasing one or more droplets of a first fluid with one or more droplets of a second fluid within a microfluidic apparatus, the method comprising:

providing a main channel carrying one or more droplets of the second fluid immersed in the carrier fluid, providing an auxiliary channel, formed as a reservoir having a predefined closed volume and comprising the first fluid, fluidly coupled to the main channel at two intersections, with a first intersection via a first orifice of the auxiliary channel configured to create a first fluid interface between the carrier fluid and the first fluid in the auxiliary channel, and with a second intersection downstream to the first intersection via a second orifice of the auxiliary channel configured to create a second fluid interface between the carrier fluid and the first fluid, imparting a flow of the carrier fluid into the main channel, inducing therefrom a difference of pressure between the first and second orifice generating a balance condition such that a meniscus of the second fluid interface is maintained in the auxiliary channel, at the vicinity of the second orifice, creating a balance deviation, with regard to the balance condition, greater than a predefined threshold, thereby triggering a release of a volume of the first fluid from the second interface into the main channel, wherein the balance deviation with regard the balance condition at the second fluid interface is generated by:

at least one droplet of the second fluid passing in the main channel between the first intersection and the second intersection, thereby increasing the pressure drop and triggering a release of a volume of the first fluid from the second fluid interface, and/or an actuator allowing a release of a volume of the first fluid from the second fluid interface.

\* \* \* \* \*